Dec. 15, 1959  B. VON PLATEN  2,917,082
HIGH PRESSURE CYLINDER
Filed March 13, 1956  3 Sheets-Sheet 1
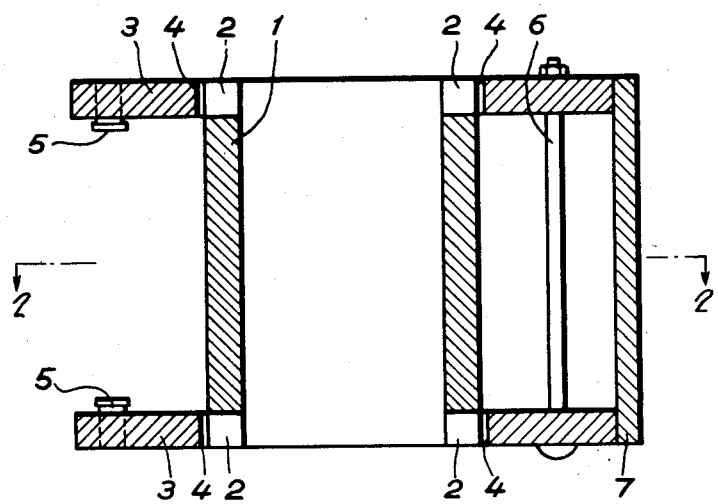
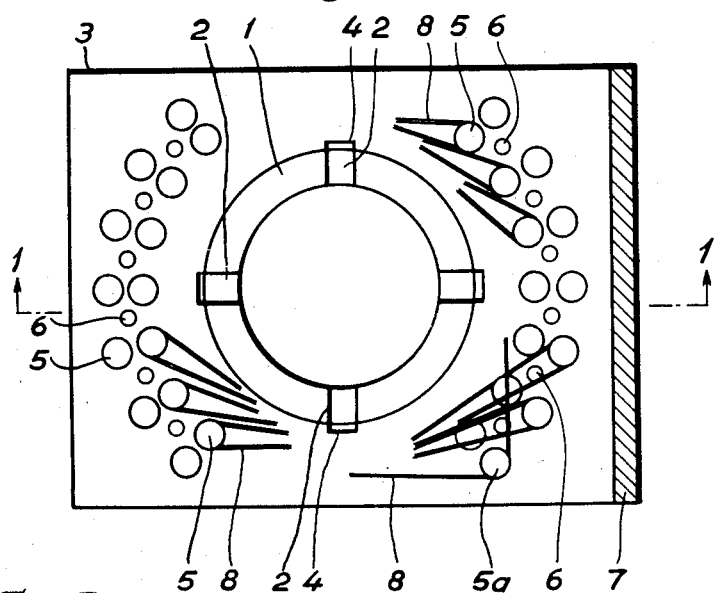
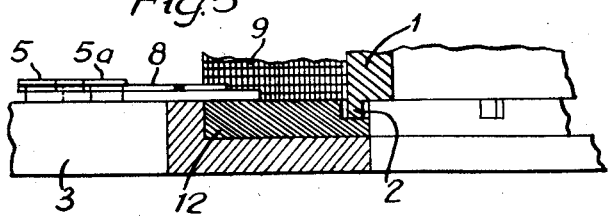
Inventor
Baltzar von Platen
BY
Attorney.

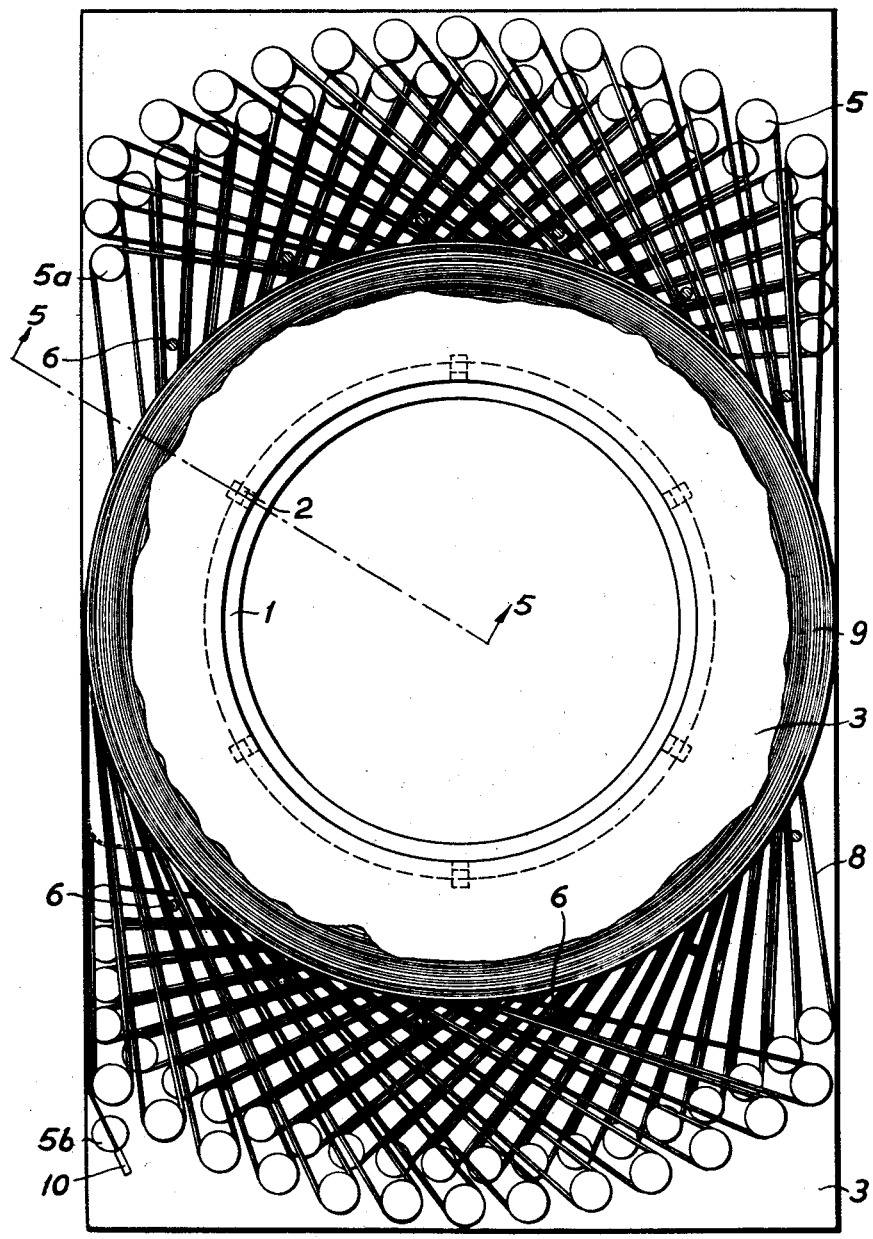

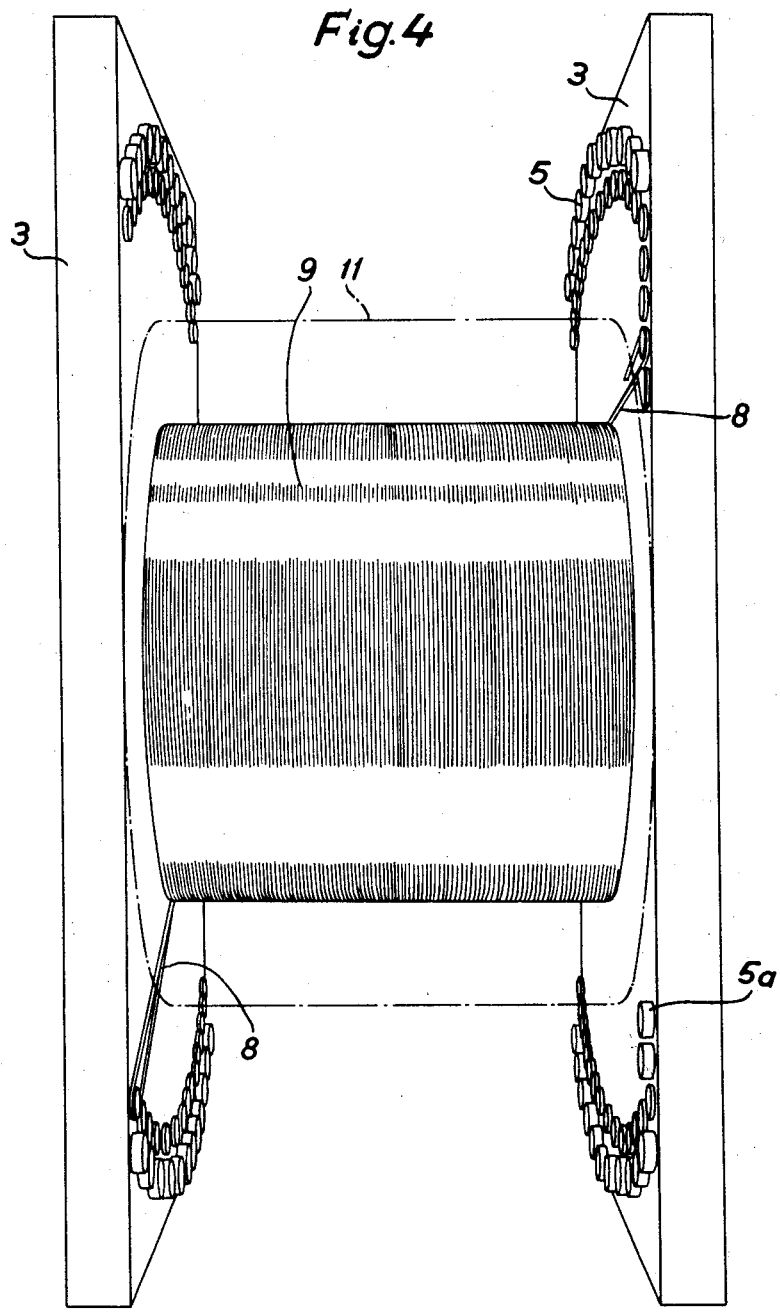

United States Patent Office 2,917,082
Patented Dec. 15, 1959

2,917,082

HIGH PRESSURE CYLINDER

Baltzar von Platen, Stockholm, Sweden, assignor to Allmanna Svenska Elektriska Aktiebolaget, Vasteras, Sweden, a Swedish corporation Application March 13, 1956, Serial No. 571,283

Claims priority, application Sweden March 18, 1955

4 Claims. (Cl. 138—69)

The present invention concerns a cylinder which, although having a comparatively large inner diameter, is able to withstand an inner overpressure of several thousands of atmospheres. Such a cylinder may for instance be used as the cylindrical wall in a vessel used for treating material under a very high pressure.

It is, however, not possible to design a high pressure cylinder able to withstand a high inner overpressure, as a solid pipe with a thick wall, because when the thickness of the wall becomes large, the distribution of the stresses will be very uneven. In reality the stress rapidly decreases from the inner surface of the cylinder to the outer one, so that an increased wall thickness will give only a very small increase in the strength of the cylinder. If, however, the outer part of the cylinder wall is given a pre-stress, the ability of the cylinder to withstand an inner pressure is increased. A high pressure cylinder, therefore, generally is made of a pipe with a comparatively thin wall, on which one or a plurality of mantles are shrunk. Th pre-stress may also be attained by winding one or a plurality of layers of wire or other strip on the inner pipe, said strip having a high tensile strength and being wound on the pipe with a certain tension. This pre-stress may be varied from one layer to the succeeding one in such a manner that, when the highest intended pressure in the cylinder is reached, the stress in the strip mantle will be practically the same from the innermost to the outermost layer. In cylinders of this kind, the strength of the wire or other strip has, however, been weakened at the joining points and at the points where the strip changes over from one layer to another. The proper tensile strength of the wire or other strip material could not therefore be entirely utilized.

The present invention concerns a high pressure cylinder with a wound strip mantle, which is so made that the strip is not weakened at the joining points or at the change over between two layers of the strip. The cylinder according to the invention comprises an inner pipe with a comparatively small thickness of the wall, and around this pipe there is wound a mantle consisting of a plurality of layers of wire or other small strips and of two flanges at the ends of the pipe. The cylinder is mainly characterized in that the strip of mantle is divided into two or more groups of winding layers in each of which groups all the winding layers have the same direction. The winding layers in two adjacent groups have, however, an opposite direction so that when one of the groups is formed of layers of right-hand helices the groups adjacent thereto are each formed of layers of left-hand helices. When changing over from one winding layer to the consecutive one within a group with the same winding direction, the strip leaves the mantle tangentially and is bent through 180° around pins attached to the inner side of the flanges and then again led back to the mantle. When changing over from the last layer of one group to the first layer of a consecutive group, the strip, however, is bent through only 90° around the pins attached to the flanges. Joints in the strip are made outside of the mantle between the mantle and the pins in the flanges. The inner pipe of the cylinder is suitably so joined with the flanges that it can change its diameter independently of them but is centered in relation to them. The pipe is therefore provided with at least three projections and with corresponding radial slots in the flanges or in rings movable in the flanges, in which slots the said projections may move when the pipe changes its diameter.

The invention is most readily understood with reference to the accompanying figures. Figs. 1 and 2 show schematically a cylinder according to the invention and Figs. 3 to 5 show practical forms of execution. Fig. 1 shows a section along the line B—B in Fig. 2 and Fig. 2 a part section along the line A—A in Fig. 1 with one of the flanges omitted. Fig. 3 is an end view of the cylinder, one flange being partly removed. Fig. 4 is a perspective view of the cylinder provided with only a few layers of the strip. Fig. 5 is an enlarged detail section taken on the line C—C, Fig. 3, and shows a method for joining the inner pipe with one of the flanges.

In Fig. 1, 1 designates a cylindrical pipe which on both ends is provided with projections 2. At each end of the pipe there is a flange 3. These flanges are provided with radially directed slots 4 with parallel sides, in which the projections 2 on the pipe may freely move in a radial direction. By this arrangement the geometrical axes of the flanges and the pipe are fixed in relation to each other, but the pipe may freely expand or contract according to the pressure in the cylinders. 5 designates a plurality of pins inserted in the flanges 3, and 6 designates bolts joining the flanges with each other, when the winding of the mantle is completed. A suitable location of these bolts is illustrated in the schematic views, Figs. 1 and 2; but the preferred location of these bolts 6 with respect to the other parts of the structure is shown in Fig. 3 where the said bolts are arranged in closer poximity to the outer surface of the cylinder. 7 is a wall which is joined with the two flanges and which transmits from one flange to the other the torque coming from the stress in the strip. By the arrangement of this wall the tangential forces from the projections 2 on the walls of the slots 4 are removed or at least considerably reduced, so that the projections, independently of friction forces, may move radially in the slots 4 in the flanges. 8 designates the steel strip from which the mantle is built up.

The strip is wound on the pipe 1 in the following way.

One end of the strip is attached for instance to the left hand flange 3 and is wound on the pipe with a certain tension in a tight helix from the left to the right in, say, a clockwise direction looking from the right-hand flange. The strip helix will then entirely cover the pipe and the pitch will be equal to the width of the strip. At the right hand flange the strip leaves the pipe 1 tangentially and is turned through 180° around a pin 5 in the right hand flange, and the strip is then wound in a counterclockwise direction on the preceding layer, but now from the right to the left. The direction of winding of the helix will, however, be the same in the two layers. In this manner x layers are wound, and the group will be named the x-group. Throughout this group the strip, when changing from one layer to another, thus will turn through 180° over the pins 5 and run back in an outer layer in a direction opposite to that of the underlying layer so that the layers are all formed of, say, right-hand helices. When the last x-layer is finished, the strip is bent through only 90° around a pin 5a, and the next layer, which in the specification is called y-layer, is wound in the same circumferential direction as the preceding layer. At the lower right-hand part of Fig. 2 the strip is shown bent through 90° around the pin 5a with the adjacent parts of the strip arranged at a tangent to the winding surface of the mantle. The helix will therefore change when changing from one group to another. Subsequently further y-layers are wound in the same circumferential direction as the preceding y-layer. In the whole latter group of layers the strip between the layers will turn through 180° around the pins 5.

As the strip 8, when changing from one layer to a succeeding one, is bent through 180° around the pin 5, the tension in the strip will cause a torque between the pipe and the flanges. The strip in the x-groups and the strip in the y-groups may, however, cause opposite torques $Mx$ and $My$ which by a suitable choice of the number of the x-layers and y-layers at a certain pressure in the cylinder may be equal, so that $Mx-My$ will be 0. At all other pressures, however, the torque difference $Mx-My$ will be different from 0, because the tension in the strip is a function of the pressure. The resulting torque $Mx-My$ is equal in the two flanges but oppositely directed and is transmitted from one flange to the other by means of the projections 2 and the pipe 1. This will cause great forces on the projections 2, so that there will be large frictional forces between them and the sides of the slots 4. The torque difference $Mx-My$ is therefore transmitted over from one flange to the other by means of a plate 7.

Joints in the strip are formed in the strip part between the outer diameter of the mantle and the pins. The joining may here be performed so that the joint will be as strong as the strip itself.

In Fig. 3 an end view of the finished cylinder is shown. In this view the larger part of one of the flanges 3 is supposed to be cut off. The completed mantle is designated by 9. In this figure it is also shown how the ends of the strip are attached to the flanges 3. The strip 8 is inserted in a slot in a pin 5b and a sleeve 10, which is jammed on the strip, and transmits the power from the strip to the pin. The connecting bolts 6 in this figure have an arrangement somewhat different from that of the corresponding bolts in Fig. 2, but serve the same purpose.

Fig. 4 shows the cylinder, only one or a few layers of the strip being wound on the inner pipe. This figure shows clearly how the strip 8 is bent through 180° around the pins 5 when changing from one layer to a succeeding one. The dot-and-dash line 11 indicates the complete mantle.

In Fig. 5, which corresponds to the upper left-hand portion of Figure 1, it is shown how the pipe 1 and flanges 3 are fixed in relation to each other in such a manner that no torque can become transmitted from the flange to the pipe. In this flange 3 there is a ring 12 rotatably arranged, and in this ring there are radial slots in which the projections 2 may move radially. As the ring in this device can rotate freely in relation to the flange, the whole torque difference $Mx-My$ must be transmitted from one flange to the other through the said plate 7.

I claim as my invention:
1. In a casing designed to withstand high internal pressures, a wall structure of substantially cylindrical form, comprising an internal pipe member, a strengthening mantle surrounding the pipe member and formed of strip material wound around said member in the form of a plurality of groups superimposed layers, and means located at the ends of the pipe member and around which the strip material between the ends of adjacent layers in each group is looped and directed back to the same circumferential side of the cylindrical structure so that the individual layers in one group are all formed of right-hand helices, and similar means around which the strip material between the ends of two adjacent layers in different groups of layers is looped and directed back to the opposite circumferential side of the cylindrical structure so that a left-hand helix forms the layer adjacent to the said right-hand helix in the adjacent group of layers.

2. A wall structure for a casing according to claim 1, comprising end flanges mounted on the pipe member and pin-and-slot means connecting the flanges with the pipe member so that the pipe member may expand under internal pressure.

3. A wall structure for a casing according to claim 1, comprising end flanges on the pipe member, ring members located between said flanges and the ends of the pipe member and having radial slots therein and end projections on the pipe member engaging said radial slots in the ring members so as to permit radial expansion of the pipe member under internal pressure.

4. In a casing designed to withstand high internal pressures, a wall structure of substantially cylindrical form comprising an internal pipe member, a strengthening mantle surrounding the pipe member and formed of strip material wound around said member in the form of a plurality of groups of superimposed layers, flange members arranged at the ends of the internal pipe member with their inner faces opposed to each other and inwardly projecting pin members formed on said opposed faces and around which the strip material is bent through an angle of substantially 180° in passing from one layer to a similar layer in the same group of layers, and similar pin means around which the strip material is bent through an angle of substantially 90° in passing from one layer to the adjacent layer in a different group of layers.

References Cited in the file of this patent

UNITED STATES PATENTS

| | | |
|---|---|---|
| 817,060 | Greenfield | Apr. 3, 1906 |
| 1,804,888 | Monsch | May 12, 1931 |
| 1,969,540 | Bergstrom et al. | Aug. 7, 1934 |
| 2,370,677 | Mapes | Mar. 6, 1945 |

FOREIGN PATENTS

| | | |
|---|---|---|
| 522,343 | Great Britain | June 14, 1940 |
| 553,110 | Great Britain | May 7, 1943 |
| 487,727 | Italy | Dec. 9, 1953 |